United States Patent [19]
Laube

[11] Patent Number: 5,286,042
[45] Date of Patent: Feb. 15, 1994

[54] TOOL HOLDER WITH CENTERING ADJUSTMENT

[75] Inventor: Robert Laube, Mt. Clemens, Mich.

[73] Assignee: Hydra-Lock Corporation, Warren, Mich.

[21] Appl. No.: 36,493

[22] Filed: Mar. 24, 1993

[51] Int. Cl.⁵ .............................................. B23B 31/36
[52] U.S. Cl. .................................. 279/133; 279/4.03; 408/156; 408/162; 408/188
[58] Field of Search ..................... 279/4.03, 133, 154; 408/156, 162, 180, 187, 188, 714; 409/234

[56] References Cited

U.S. PATENT DOCUMENTS

| | | | |
|---|---|---|---|
| 2,567,471 | 9/1951 | Collgert et al. | 279/4.03 |
| 2,797,603 | 7/1957 | Atherholt et al. | 82/44 |
| 3,261,236 | 7/1966 | Flannery | 408/156 X |
| 3,335,569 | 8/1967 | Atherholt | 60/54.5 |
| 3,677,559 | 7/1972 | Andre et al. | |
| 4,218,068 | 8/1980 | Lutz et al. | 408/146 |
| 4,930,957 | 6/1990 | Priessnitz | 408/156 X |

Primary Examiner—Steven C. Bishop
Attorney, Agent, or Firm—Barnes, Kisselle, Raisch, Choate, Wittemore & Hulbert

[57] ABSTRACT

A tool holder for a machine tool is provided with a tool shank clamping mechanism in the form of an expanding or contracting sleeve, hydraulically actuated, and the chuck has an annular groove aft of an annular collar on the clamping mechanism. Circumferentially spaced conical screws, mounted axially in the collar, bear against the body of the tool chuck and allow fractional tilting of the clamping mechanism relative to the true holder and spindle axis to provide exact centering of the cutting end of the mounted tool.

6 Claims, 2 Drawing Sheets

TOOL HOLDER WITH CENTERING ADJUSTMENT

FIELD OF INVENTION

This invention relates to a machine tool and more particularly to a tool holder for a machine tool.

BACKGROUND AND FEATURES OF THE INVENTION

Power-operated machine tools have a rotating spindle and a workholding chuck. Various tools are received in a tool holder for mounting on a rotating spindle for drilling, reaming and other metal removing operations. These tools may have a long shank with an end receivable centrally in the tool holder and the cutting end may project some distance from the tool holder for deep drilling or reaming.

It is extremely difficult, if not impossible, to produce a tool with a long shank in which when rotating the cutting end does not have what is termed "run-out", that is, orbital or rotational movement at the cutting end because it is not on dead-center with the axis of rotation of the machine tool spindle. The present invention is directed to a tool holder design which provides compensation for this "run-out" and allows adjustment of the cutting end of the tool to an "on-center" position with little or no run-out.

SUMMARY OF THE INVENTION

A rotating tool holder for a machine tool is provided with a tool shank clamping mechanism preferably in the form of an expanding or contracting sleeve, hydraulically actuated, and the holder has an annular groove aft of an annular collar on the clamping mechanism. Circumferentially spaced conical or cone point screws, mounted in the annular groove, bear against the body of the tool holder and allow fractional tilting of the clamping mechanism relative to the true holder and spindle axis to provide exact centering of the cutting end of the mounted tool.

An object of this invention to provide a tool holder which not only clamps the shank of a tool securely but which also allows compensatory adjustment of the clamped tool to achieve dead center rotation at the cutting end. In some instances, the cutting end of the tool may project 8" to 12" from the holder so that exact centering is significantly important.

Other objects of the invention include a tool holder which is provided with a relatively simple modification to allow the compensatory centering adjustment to be readily achieved, compensates for and permits use of cutting tools having some run-out, and is rugged, durable, well balanced, of simple design, economical manufacture and assembly, and in service has a long useful life.

These and other objects and features of the invention will be apparent from the following detailed description, accompanying drawings and claims in which the details of the invention are set forth to enable those skilled in the art to practice the invention, all in connection with the best mode presently contemplated for the practice of the invention.

BRIEF DESCRIPTION OF THE DRAWINGS

DRAWINGS accompany the disclosure and the various views thereof may be briefly described as.

DETAILED DESCRIPTION OF THE INVENTION

Figure 1:
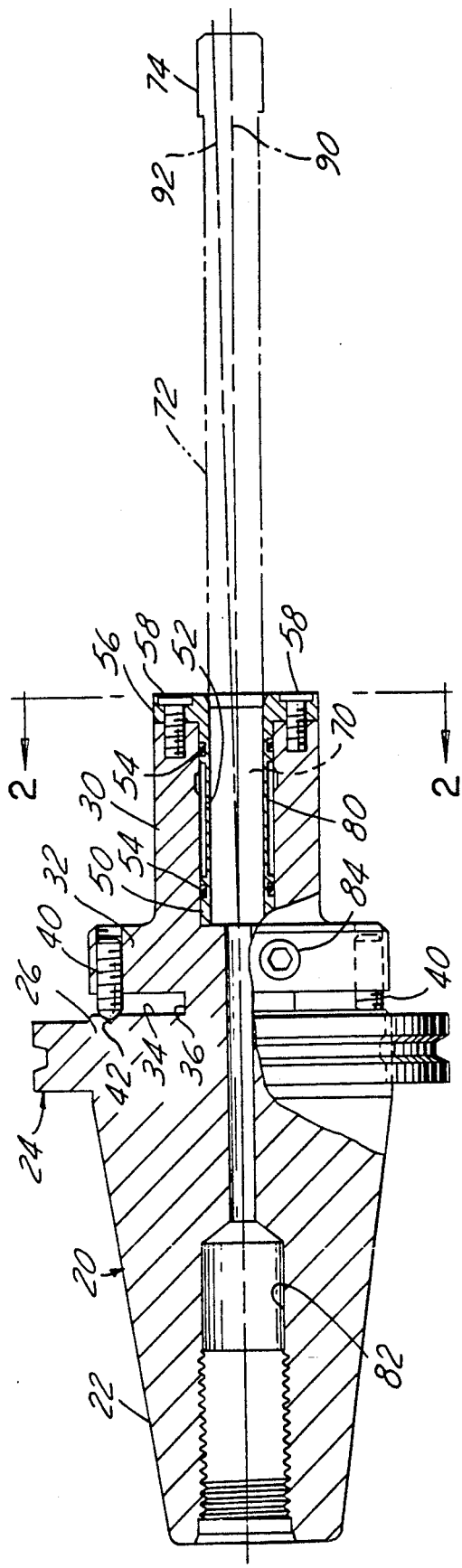
FIG. 1 is a side view with portions in section of a tool holder embodying this invention with a cutting tool received therein.

In FIG. 1, a tool holder body 20 has a tapered end 22 to be mounted in a spindle of a machine tool such as a lathe (not shown). A grooved collar 24 is secured to the cylindrical end 26 of the body 20. On the tool end of the body 20 is a cylindrical extension 30 which has a relatively thick and rigid annular flange 32 spaced from the body 20 by a deep annular groove 34 forming a necked down central portion 36 connecting the tapered and extension portions.

Three cone point screws 40 are threaded into the flange 32, disposed generally parallel to the axis of the body, and spaced outward of the axis near the periphery of the flange 32. The cone point of each screw preferably seats in a conical depression 42 in the face of body 20 adjacent the groove 34.

Within the cylindrical extension 30 is a cylindrical recess in which is positioned a tool clamping expansion sleeve 50. This sleeve has a thin wall 52, on each end of which is a sealing O-ring 54 received in a groove. The outer end of the sleeve 50 is formed with a retention flange 56 held in place against the outer end of extension 30 by four headed screws 58.

The sleeve wall 52 is designed to contract inwardly against the shank 70 of a metal removing tool 72 having cutting blades 74 at the distal end. This tool holder can be designed with a radially inwardly or outwardly expanding sleeve depending on the design of the tool to be clamped. Earlier U.S. patents disclose expansion sleeve designs are: U.S. Pat. Nos. 2,797,603 (1957); 3,335,569 (1967) and 3,677,559 (1972). The flexible sleeve wall 52 may be formed of a thin stainless steel or a high density material such as nylon or Teflon TM.

The wall 52 is moved inwardly against a tool shank by hydraulic pressure of a heavy grease which fills the cavity 80 outside the wall 52. A piston (not shown) can be mounted in a central passage 82 in body 20, or in the flange 32 and actuated by an externally accessible screw 84, in a radially disposed recess. Force on the piston creates pressure in the recess 80 which moves the wall 52 uniformly into tight contact with the tool shank 70, gripping it tightly and on center in the tool carrier portion 30 of the body. The above-cited patents disclose in detail the expansion sleeve and the means to create the internal hydraulic pressure in the sleeve. Also, in FIG. 3, an actuator screw and piston is illustrated to develop the expansion pressure for the gripping sleeves.

Once the tool shank 70 and tool 72 is tightly gripped in the sleeve 50, the circumferentially spaced cone point screws 40 can be tightened as necessary to move the cutting end 74 of the tool onto exact center. In FIG. 1, the dash line 90 shows the true center. The dash line 92 shows the tool center prior to tuning by adjusting the screws 40 to move the off-center line 92 to coincide with the true center line 90, thus eliminating run-out when the chuck body 20 is rotated in the drive spindle. There is a certain amount of movement of flange 32 relative to the flange 24 in this adjustment but the metal in the central portion 36 will accommodate this movement within its elastic limit so that there is no permanent deformation of the central portion 36 of the body.

Figure 3:
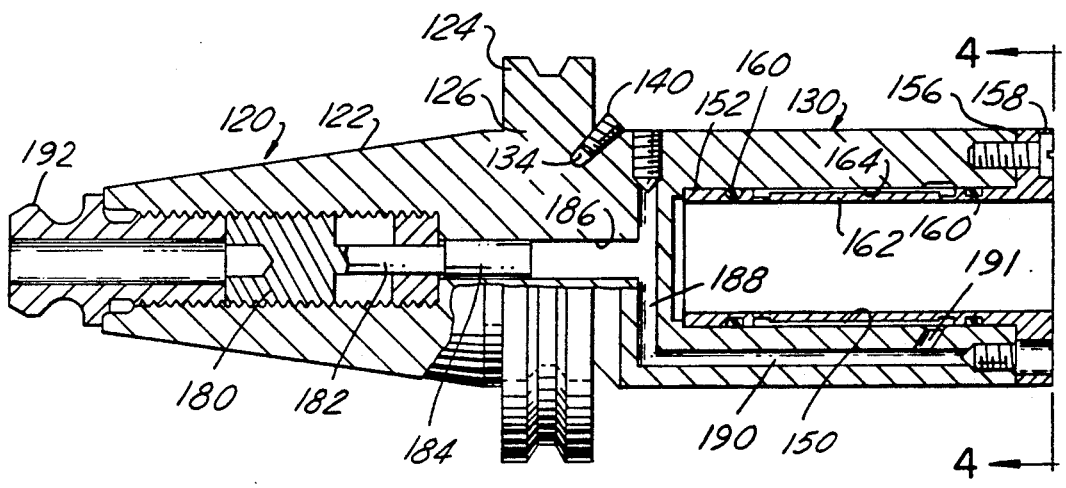
FIG. 3 is a side view partially in section of a modified tool holder embodying this invention.
Figure 4:
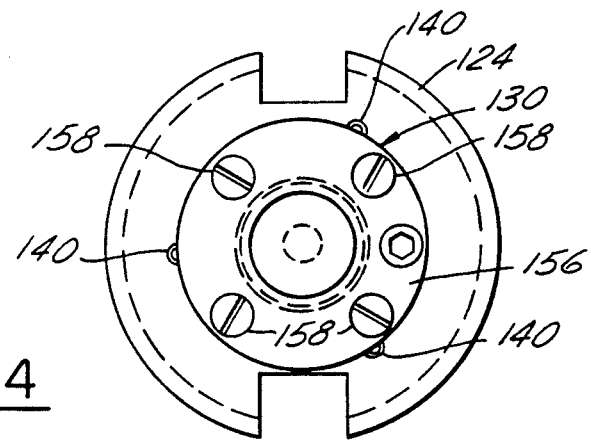
FIG. 4 is an end view on line 4—4 of FIG. 3.

In FIGS. 3 and 4, a modified chuck body is illustrated. A body 120 has a conical portion 122 to fit into a machine spindle. A grooved collar 124 is secured to a cylindrical portion 126 of the body. Cylindrical extension 130 projects from the body 120 and an angled groove 134 is machined into the body between the portion 126 and the extension 130. Conical screws 140 are circumferentially disposed in the groove 134 such that when screwed into the slot, the extension 130 can be adjusted relative to the true center as described in connection with FIG. 1.

The extension 130 has a central cylindrical recess 150 in which is located a sleeve 152 having an external fastening flange 156 secured to the end face of the extension 130 by socket screws 158. Seals are provided by O-rings 160 received in mounting grooves located at each end of the sleeve 152 and between these O-rings is a movable sleeve portion 162 within an annular pressure chamber 164.

An actuator screw 180 threaded into a central passage in body 120 has a drive pin 182 which bears against a piston 184 in a central passage 186. Passages 188, 190 and 191 in the body 120 and extension 130 lead to the annular chamber 164 surrounding sleeve portion 162 between the O-ring seals 160. When the passages ahead of the piston 184 are filed with grease, the hydraulic pressure from piston movement will move the sleeve wall 162 uniformly against a shank of a tool projecting from the sleeve 152. The sleeve wall 162 can be a thin metal or high density plastic such as nylon or Telfon TM. Thus, a tool shank may be securely fastened in a centered position in the extension 130. Actuation of the conical screws 140 spaced circumferentially around the angled groove 134 can correct the centerline of the cutting end of a projecting tool to dead center and eliminate any "run-out" when the chuck body 120 is rotated in the machine spindle. A retainer knob 192 is threaded behind the actuator screw 180.

Figure 2:
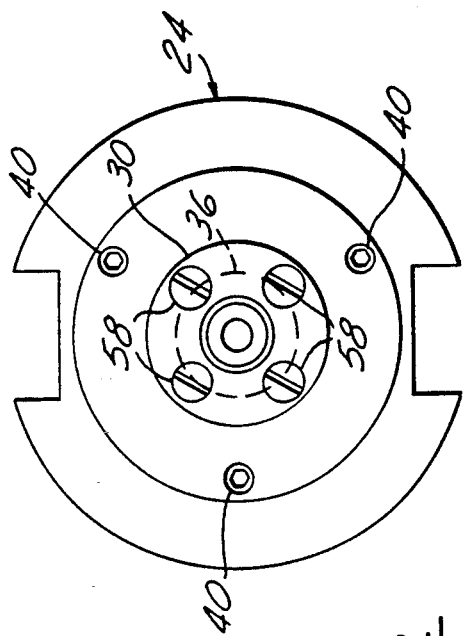
FIG. 2 is an end view on line 2—2 of FIG. 1.

The angled slot 140 can be in a plane perpendicular to the axis, as in FIG. 2, or at an acute included angle to the axis as shown in FIG. 3.

What is claimed is:

1. A tool holder for mounting an elongate tool for rotation in a machine tool comprising:
   (a) an elongate body having a central recess to receive a holding shank of an elongate tool, said body having a first portion to be mounted for rotation in a machine tool and a second portion to receive the shank of a tool, an annular groove between said first and second portions,
   (b) means in said second portion to clamp a tool shank, and
   (c) adjustment means comprising a plurality of circumferentially spaced conical point screws each threaded into opposite sides of said groove to adjust the angle of said second portion relative to the centerline of said first portion to center a cutting end of the elongate tool on said center line.

2. A tool holder as defined in claim 1 in which said means in said second portion to clamp a tool shank comprises a cylindrical recess, a sleeve in said recess having a radially movable wall, and means to force said wall into uniform contact with the surface of a tool shank.

3. A tool holder for mounting an elongate tool for rotation in a machine tool comprising:
   (a) an elongate body having a central recess to receive a holding shank of an elongate tool, said body having a first portion to be mounted for rotation in a machine tool and a second portion to receive the shank of a tool, said portions being separated by a radially narrowed portion, said narrowed portion comprising a groove between said first and second portions,
   (b) means in said second portion to clamp a tool shank, and
   (c) an adjustment means comprising a plurality of circumferentially spaced conical screws threaded into opposite sides of said groove to adjust the angle of said second portion relative to the centerline of said first portion to center a cutting end of the elongate tool on said center line.

4. A tool holder as defined in claim 3 in which said screws are conical point screws.

5. A tool holder as defined in claim 3 in which said means in said second portion to clamp a tool shank comprises a cylindrical recess, a sleeve in said recess having a radially movable wall, and means to force said wall into uniform contact with the surface of the tool shank.

6. A tool holder as defined in claim 5 in which said screws are conical point screws.

* * * * *